Oct. 22, 1935.  G. W. McGUIRE  2,018,311
RAKE
Filed July 15, 1933
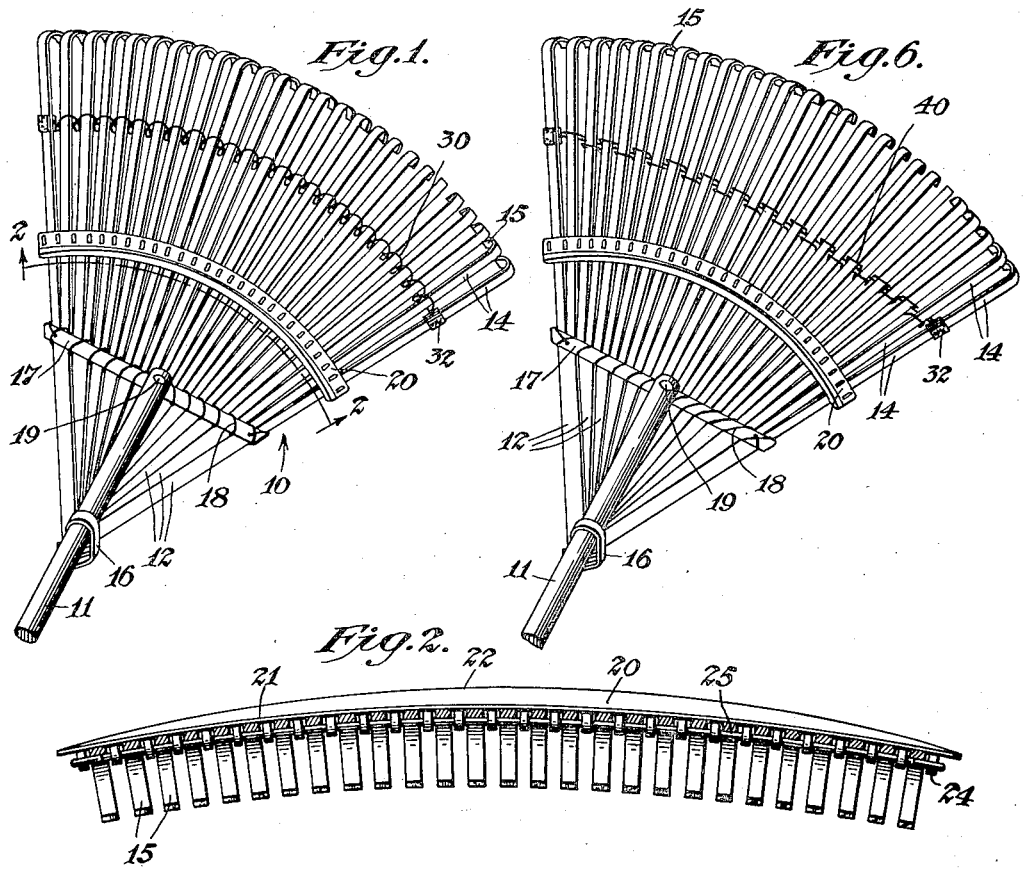
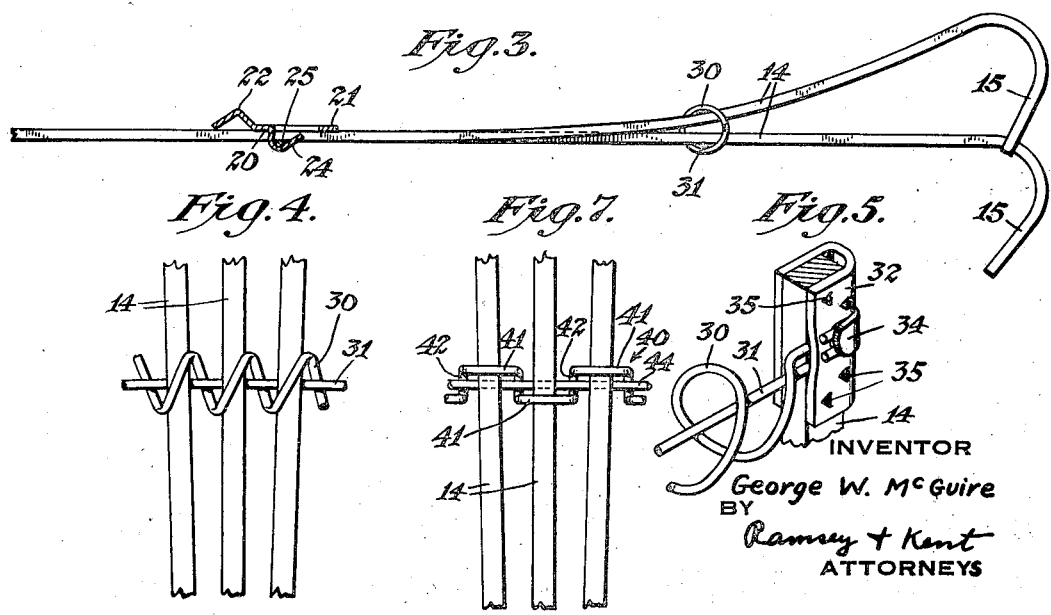
INVENTOR
George W. McGuire
BY
Ramsey + Kent
ATTORNEYS Patented Oct. 22, 1935

2,018,311

UNITED STATES PATENT OFFICE 2,018,311

RAKE

George W. McGuire, Upper Montclair, N. J.

Application July 15, 1933, Serial No. 680,540

7 Claims. (Cl. 55—10)

This invention relates to improvements in rakes and more particularly to improvements in bamboo rakes of the type used principally for raking leaves and for similar purposes.

In my copending application Serial No. 463,428, filed June 24, 1930, which has matured into Patent No. 1,989,815, an improved bamboo rake has been shown in which use is made of a metallic clip which serves as a reenforcing and spacing member to hold the tines of the rake in their proper spaced apart relation. Such clip is usually positioned intermediate the inner and outer ends of the tines, and as result of such placing it has been found in practice that often times a tine upon striking an obstruction, such as a stone, will be bent upwardly with the edge of the metallic clip limiting the flexing of the tine. Occasionally a tine may snap off at the edge of the metallic clip.

An object of the present invention is to provide a yielding reenforcement for the tines of a bamboo rake, such reenforcement being so positioned as to tie the tines together and to serve as a mutual reenforcement therefor.

A further object of the invention is to provide a reenforcing member for the tines of bamboo rakes of such construction as to possess a pocket for each tine with each pocket connected to adjacent pockets.

In my present invention, rakes are constructed in the fashion set forth in my copending application above identified, in that the strips of bamboo which are split to form a plurality of tines are arranged to impart a fan-like form to the rake. Intermediate the inner and outer ends of the tine members is a metallic clip which serves to reenforce the tines and to space them. This clip is arched upwardly a slight amount so that the outer ends of the tines will contact uniformly with a plain surface when the rake is held at an angle to said surface. Between the metallic clip and the outer ends of the tines is positioned a reenforcing member so formed as to provide a separate pocket for each tine, such pockets being joined to adjacent pockets to provide a unitary structure. The tines are locked in their respective pockets by means of a secondary member which is positioned preferably on the underside of the rake and is coextensive in length with the reenforcing member. In one form of the invention, the reenforcing member is in the nature of a wire, shaped in the form of loose coils. This coiled wire has its ends secured to extreme tines and is so positioned relative to the remaining tines that each tine will lie in one of the loops formed by the coils. A second wire member passes under all the tines inside of the coils of the reenforcing member to hold the tines in the loops. In another form, the reenforcing member is made in the form of a wire shaped to provide a plurality of pockets arranged substantially parallel to each other and separated by short expanses, which themselves serve to retain the locking wire which fastens the tines in the respective pockets.

Other features and advantages of the invention will become apparent by reference to the following detailed description taken in conjunction with the accompanying drawing forming a part of the same, wherein Fig. 1 is a plan view of a bamboo rake embodying the invention.

Fig. 2 is an enlarged section substantially on the line 2—2 of Fig. 1.

Fig. 3 is an enlarged section lengthwise of the rake, showing the manner in which the tines may yield under the restraining influence of the mutual reenforcing member.

Fig. 4 is a fragmentary view of a part of the rake showing in enlargement the manner in which one form of mutual reenforcement member is positioned relative to the tines.

Fig. 5 is a fragmentary view showing the manner in which the reenforcement member and the locking member are secured to the extreme tines.

Fig. 6 is a view similar to Fig. 1 of a modified form of the invention; and

Fig. 7 is a view similar to Fig. 4 of the same modified form of the invention.

Referring now to the drawing and particularly to Figures 1 to 5, inclusive, the rake indicated generally at 10 includes a handle 11 (the lower end only of which is shown) to the lower end to which is secured a plurality of flat bamboo strips 12. Each strip 12 is split at its outer end to form two or more tines 14. The outer end of each tine 14 is permanently bent to form a finger 15. The inner ends of the strips 12 are superimposed and are fastened to the handle 11 by means of a suitable clip member 16. A strip 17, of wood or bamboo, is placed across each side of the strips 12 and secured to the strips by means of wire lacing 18. The end of the handle is secured to these strips by means of a rivet 19 or by any other suitable means.

To reenforce the rake and hold the tines in evenly spaced apart position, a metal clip 20 is provided. This clip is made up of a flat portion 21 (Figures 2 and 3) which has integrally therewith a stiffening rib 22. The clip has a number of fingers 24 punched therefrom and spaced to fit between the tines of the rake. A wire 25 passing under the tines is held in position by bending the fingers 24 upwardly as shown in Fig. 3. This clip 20 is arched as shown in Figure 2, so that the rakes assumes a slightly bowed shape to permit the fingers 15 on the ends of the tines to contact uniformly with a surface when the rake is held at an angle to the surface, as will be the case ordinarily when use is made of the rake.

To prevent undue flexing of the various tines, with the edge of the clip 20 limiting the flexing of the tines, use is made of the mutual reenforcing member 30 (Fig. 1). As shown in Figure 4 the reenforcing member 30 is in the nature of a wire formed into loose coils. The wire is so secured to the rake that the tines thereof fit into loops in the wire, which loops actually constitute pockets for the reception of the tines. A secondary member 31 in the nature of a straight wire passes under the tines and through loops in the wire 30 to hold the tines in their respective pockets.

The reenforcing wire 30 and the securing wire 31 are fastened to the extreme tines by means of a fastening member 32. This member 32 is made up from a flat piece of metal bent into substantially U-shape (in cross section as shown in Figure 5) and having a tab 34 punched from the loop of the U midway the length of the fastening member. A number of claws 35 are stamped from the sides of the attaching member 32 to penetrate the opposite surfaces of the tines to which the members are attached. In assembling the rake, the ends of the wire reenforcing member 30 and the wire 31 are laid flat against one surface of an extreme tine, a fastening member 32 is slipped over the extreme tine with the tab 34 extending outwardly and with the ends of the two wires passing through the opening formed by the stamping of the tab. The ends of the wires are bent around the tine to lie over one side of the fastening member. The wires are then locked in place by pressing the tabs 34 into shape conforming with the configuration of the attaching members as closely as possible.

In Figures 6 and 7, a wire reenforcing member 40 of slightly different form from the reenforcing member 30 is shown. This member 40 is shaped to form a plurality of pockets 41 arranged alternately in spaced apart substantially parallel relation. Smaller pockets 42 connect the pockets 41. A secondary wire retaining member 44 is positioned under the tines and passes through the smaller pockets 42 to lock the tines in the various pockets 41. The ends of the members 41 and 44 can be secured to the extreme tines in the fashion before explained in connection with the members 30 and 31.

Due to the position of the mutual reenforcing members (either the member 30 or member 40) the expanses of tines beyond the metal clip 20 is provided with a reenforcement which will prevent undue flexing of any individual tines, and therefore, will eliminate the possibility of a tine snapping off at the edge of the clip 20 when an obstruction, such as a large stone, is struck by the end of the tine. In other words, if such an obstruction is met by one of the tines, this tine will bend upwardly, but due to the mutual reenforcement it can not be bent upwardly unduly without carrying the adjacent tines with it. Consequently, bending to an extent sufficient to cause breaking of the tine will not occur.

I claim:

1. A device of the character described comprising a plurality of tines secured to a handle, a metal reenforcing and spacing clip secured to said tines intermediate the ends thereof, and a mutual reenforcing member secured to said tines intermediate the outer ends thereof and the edge of said clip, said reenforcing member comprising a wire shaped to provide alternate pockets in substantial parallelism with the tines seated in said pockets.

2. A device of the character described comprising a plurality of tines secured to a handle, a metal reenforcing and spacing clip secured to said tines intermediate the ends thereof, a mutual reenforcing member secured to said tines intermediate the outer ends thereof and the edge of said clip, said reenforcing member comprising a wire shaped to provide alternate pockets in substantial parallelism with the tines seated in said pockets, and a wire passing under said tines and over the connections between the alternate pockets to lock the tines in the pockets.

3. A device of the character described comprising a plurality of tines secured to a handle, a metal reenforcing and spacing clip secured to said tines intermediate the ends thereof, a mutual reenforcing member secured to said tines intermediate the outer ends thereof and the edge of said clip, said reenforcing member comprising a wire shaped to provide alternate pockets in substantial parallelism with the tines seated in said pockets, a wire passing under said tines and over the connections between the alternate pockets to lock the tines in the pockets, and substantially U-shaped members having tabs punched from the loop portions thereof, said members being clamped to the extreme tines with the ends of said wires passing through the tab openings, said tabs being bent to restrain said wires from withdrawal from said openings.

4. A rake having tines formed of bamboo, the tines being reinforced intermediate their ends by a plurality of wire members, the wire members being anchored to each outside tine by a clip of substantially U-shape, each clip having an opening through which the wires pass and a tab engaging the wires, the clip having teeth which engage the tine.

5. A rake having tines formed of bamboo, the tines being reinforced intermediate their ends by a plurality of wire members, the wire members being anchored to each outside tine by a clip of substantially U-shape, each clip having a tab pressed out to leave an opening and having teeth which engage the tine, the wire members being hooked through the opening and being held against displacement by the tab.

6. A rake comprising a plurality of tines, a mutual reinforcing member secured to said tines intermediate their ends, said reinforcing member comprising a wire shaped to provide a plurality of U-shaped pockets, alternate pockets being disposed substantially parallel to each other, each tine being positioned in a pocket, and a second wire holding the tines in the pockets.

7. A rake comprising tines formed of flat bamboo strips, a plurality of wires reinforcing the tines intermediate their ends, an attaching clip fastened to the outside tine on each side of the rake, each clip having two flat, rectangular sides connected by an arcuate back, claws stamped from the flat sides and engaging the tine, a tab punched partly from one flat side and partly from the back, the ends of the reinforcing wires passing between a flat side of the clip and the tine, and being bent back through the opening left by the tab, the tab being bent down against the bent ends of the wires to lock the ends of the wires against displacement.

GEORGE W. McGUIRE.